United States Patent [19]
Chen

[11] Patent Number: 5,784,413
[45] Date of Patent: Jul. 21, 1998

[54] DIRECT DIGITAL SYNTHESIS FREQUENCY-AGILE QPSK MODULATOR

[75] Inventor: Keming Joseph Chen, San Diego, Calif.

[73] Assignee: General Instrument Corporation, Horsham, Pa.

[21] Appl. No.: 709,010

[22] Filed: Sep. 6, 1996

[51] Int. Cl.$^6$ ................................................ H04L 27/20
[52] U.S. Cl. ........................ 375/308; 455/118; 327/105
[58] Field of Search ............................ 375/308, 295, 375/298; 455/76, 84, 102, 118; 327/105, 117, 119

[56] References Cited

U.S. PATENT DOCUMENTS

| 4,926,130 | 5/1990 | Weaver | 327/105 |
| 5,301,367 | 4/1994 | Heinonen | 455/76 |
| 5,410,747 | 4/1995 | Ohmagari et al. | 455/118 |

FOREIGN PATENT DOCUMENTS 125701  5/1996  Japan .

*Primary Examiner*—Temesghen Ghebretinsae
*Attorney, Agent, or Firm*—Barry R. Lipsitz; Ralph F. Hoppin

[57] ABSTRACT

A frequency-agile, direct digital synthesis (DDS) modulator includes a double conversion architecture which provides an output signal having a good output spectrum with low spurious signals. The modulator is particularly suitable for providing a quadrature phase-shift keyed (QPSK) data signal. The modulator includes a direct digital synthesizer (DDS) for generating a data signal in response to a clock signal operating at an associated clock frequency. Two local oscillators are provided for respectively up-converting and then down-converting the DDS data signal to provide the output signal having the desired spectral characteristics. The first local oscillator operates at a first mixing frequency, while the second local oscillator is responsive to the clock signal for providing a second mixing signal at the clock frequency. This configuration eliminates the need for a phase lock loop for the second oscillator. Additionally, a digital-to-analog converter which is coupled to the DDS operates according to the clock signal. The first mixing frequency and the clock frequency are fixed, so that the frequency agility of the modulator is provided via an adjustable data signal which is output from the DDS

16 Claims, 7 Drawing Sheets

DIRECT DIGITAL SYNTHESIS FREQUENCY-AGILE QPSK MODULATOR

BACKGROUND OF THE INVENTION

The present invention relates to a direct digital synthesis (DDS) modulator which is particularly suitable for use in carrying digital video data via a satellite communication network. The direct digital synthesizer generates a carrier which is frequency-agile, with or without modulation. A double conversion frequency transformation processes the DDS output to provide a signal having a good output spectrum with low spurious signals.

A conventional frequency-agile modulator uses a frequency synthesizer in one or two local oscillators. For example, FIG. 1 is a block diagram of a conventional frequency-agile modulator. The modulator, shown generally at 100, receives two input digital data streams. A first data stream (Data-I) is received at a terminal 10 and stored in a buffer 12, while a second data stream (Data-Q) is received at a terminal 30 and stored in a buffer 32. After mixing, Data-I will become an in-phase data stream, and Data-Q will become a quadrature phase data stream which is 90 degrees out of phase with the Data-I stream. A carrier generator 16 provides a carrier signal at a fixed frequency to a phase shifter 18. The phase shifter then provides a mixing signal to the Data-I stream via mixer 14, and to the Data-Q stream via mixer 34 to shift the relative phases of the two data streams. The two data streams are then provided to a combiner 20 to produce a single quadrature phase-shift keyed (QPSK) signal. The QPSK signal is amplified at amplifier 22, and then mixed with a signal from a frequency synthesizer 36. The frequency synthesizer 36 is frequency-agile and therefore may be used to adjust the frequency of the signal which is output from the mixer 24. The output signal is then filtered at a bandpass filter (BPF) 26 and amplified at an amplifier 28.

With the conventional modulator of FIG. 1, the frequency-agility is provided by the frequency synthesizer 36. However, this configuration does not provide a direct digital synthesis capability. Furthermore, the output spectrum may exhibit undesirable spurious signal levels. Accordingly, it would be desirable to provide a frequency-agile modulator that provides a digital synthesis capability, and which exhibits low spurious signal levels. The modulator should utilize local oscillators operating at fixed frequencies, and should be implementable using available circuitry components which are space- and cost-efficient. The present invention provides a modulator having the above and other advantages.

SUMMARY OF THE INVENTION

In accordance with the present invention, a frequency-agile, direct digital synthesis (DDS) modulator is presented. The modulator includes a double conversion architecture which provides an output signal having a good output spectrum with low spurious signal levels.

The modulator comprises a direct digital synthesizer (DDS) for generating a data signal in response to a clock signal operating at an associated clock frequency. Two local oscillators are provided for respectively up-converting and then down-converting the DDS data signal to provide the output signal having the desired spectral characteristics. The first local oscillator operates at a first mixing frequency, while the second local oscillator is responsive to the clock signal for providing a second mixing signal at the same clock frequency which is used by the DDS. This configuration eliminates the need for a phase lock loop for the second oscillator. Additionally, a digital-to-analog converter which is coupled to the DDS operates according to the same clock signal used by the DDS and the second mixing signal.

Furthermore, the first mixing frequency and the clock frequency are fixed, so that the frequency agility of the modulator is provided via an adjustable data signal which is output from the DDS. The modulator is particularly suitable for providing a quadrature phase-shift keyed (QPSK) data signal.

Additionally, a filter may be coupled between the DDS and a first mixer for filtering the data signal according to a sin(x)/x function. An amplifier may be coupled between the first and second mixers for amplifying the up-converted data signal from the DDS, where a filter is also coupled between the amplifier and the second mixer for rejecting nonlinear distortion introduced into the up-converted signal by the amplifier.

A corresponding method is also presented.

DETAILED DESCRIPTION OF THE INVENTION

A direct digital synthesis modulator utilizes fixed local oscillators to provide a frequency-agile signal with a good spectrum and low spurious noise. The modulator is suitable for use in a satellite single channel per carrier application. In particular, for the transmission of television signals via satellite, it is desirable to provide a signal with a frequency range, including sidebands, of 70 MHz ±18 MHz, or 140 MHz ±36 MHz. The frequency resolution should be 22.5 KHz for an information rate less than 2.048 Mb/sec, or 125 KHz for an information rate greater than 2.048 MHz. The frequency accuracy should be ±1 KHz. The preferred modulation method is QPSK or Offset QPSK (OQPSK). The spurious output signal levels should be less than −40 dBc (e.g., decibels relative to the carrier) for an information rate less than 2.048 Mb/sec in any 4 KHz band, or less than −50 dBc for an information rate greater than 2.048 Mb/sec. Furthermore, the encoder performance should be better than the overall system performance, so the spurious signal goal for the agile modulator may be set to, for example, less than −56 dBc. The phase noise goal is −80 dBc/Hz at a 10 KHz offset. The following examples set forth an apparatus for providing a modulator which meets the above criteria.

Figure 1:
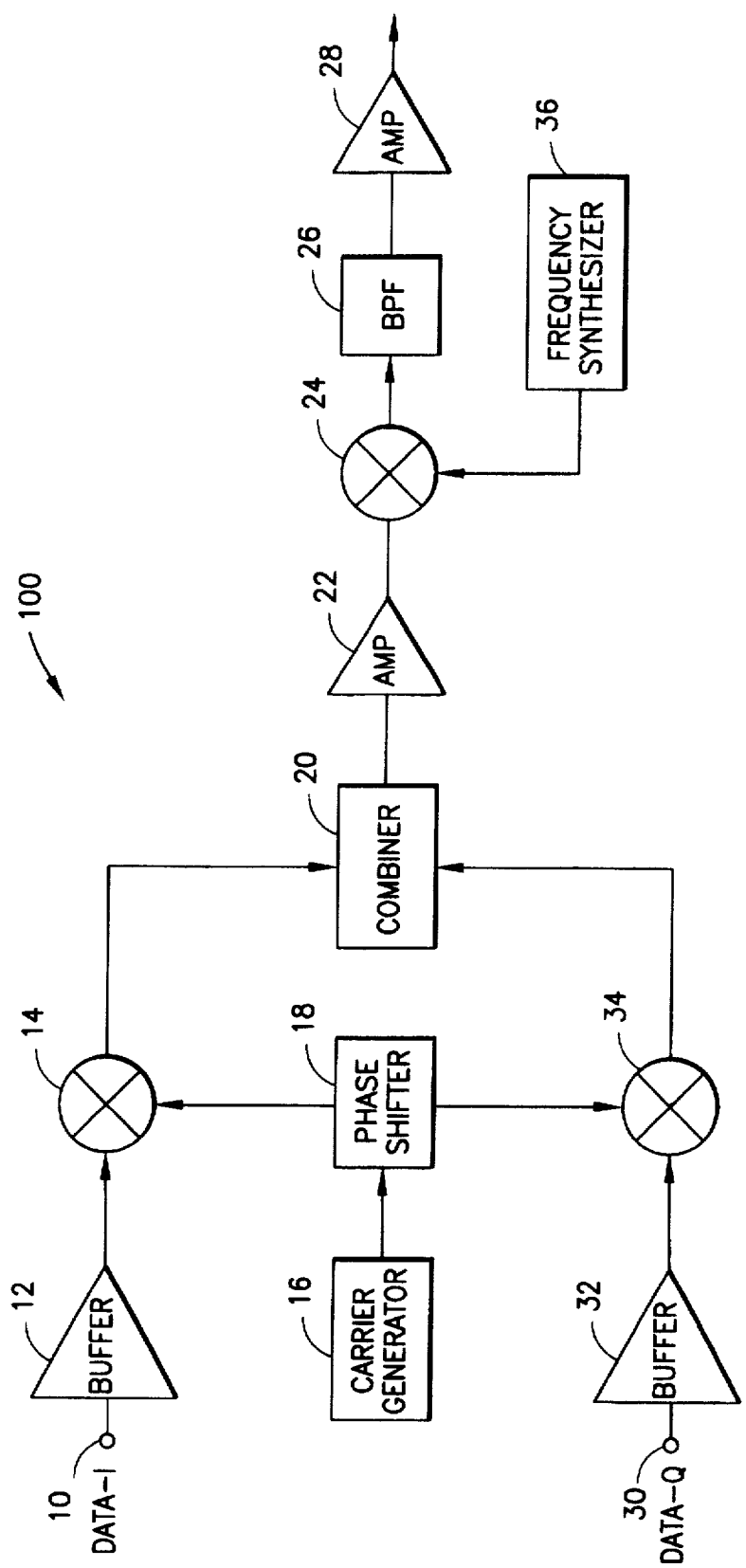
FIG. 1 is a block diagram of a conventional frequency-agile modulator.
Figure 2:
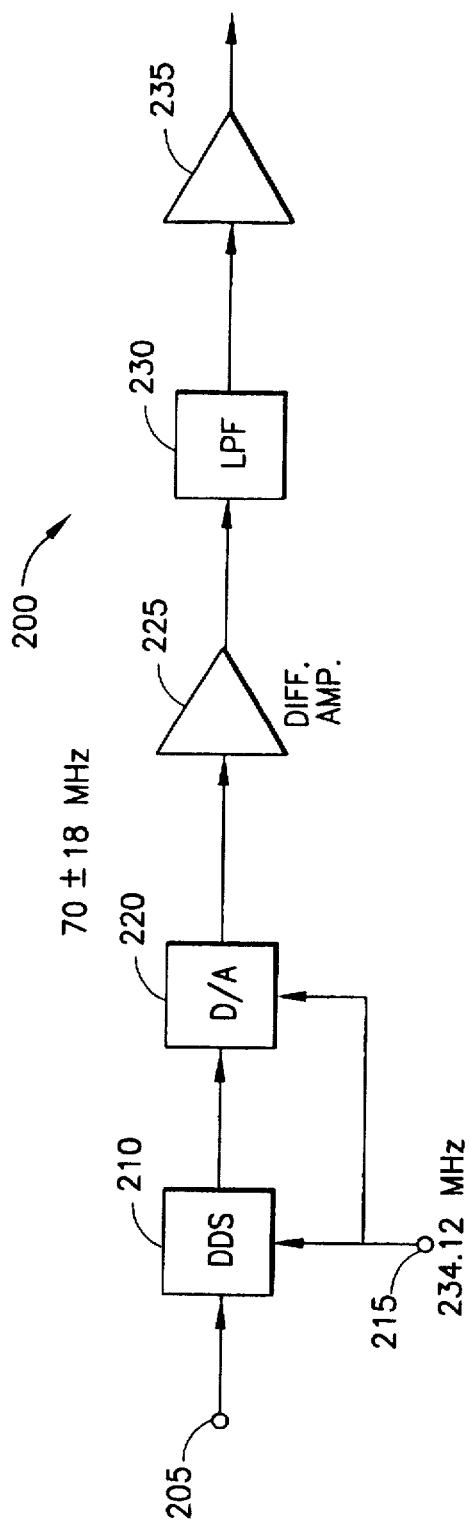
FIG. 2 is a block diagram of a modulator using a direct digital synthesizer without frequency conversion in accordance with the present invention.

FIG. 2 is a block diagram of a modulator using a direct digital synthesizer without frequency conversion in accordance with the present invention. The modulator is shown generally at 200. An input terminal 205 receives a data signal, such as a QPSK data signal, which is then provided to a direct digital synthesizer (DDS) 210. Direct digital synthesis is a technique by which a signal is generated in the form of a series of digital numbers, e.g. zeros and ones. The DDS 210 provides a signal which is characterized by a minimal phase imbalance between the Data-I and Data-Q components of a QPSK signal, a fine resolution, and a fast settling time. The DDS 210 also receives a clock signal input via a terminal 215. In the example implementation illustrated in FIG. 2, the clock signal is a steady 234.12 MHz signal. The DDS is frequency-agile and may provide a signal with an adjustable output, e.g., of 70 MHz ±18 MHz. The output center frequency of 70 MHz is a typical intermediate frequency (IF) used for transmission of television signals via satellite.

The digitally synthesized signal is provided to a digital-to-analog (D/A) converter 220, which also receives the 234.12 MHz clock signal. The output of the D/A converter 220, which is an analog signal with a frequency of 70±18 MHz, is then provided to a differential amplifier 225, then to a lowpass filter (LPF) 230, and then to another amplifier 235. Note that, in FIGS. 2–8, an amplifier is represented generally by a triangular symbol, but it will be appreciated that each amplifier is individually selected according to gain and power requirements. With this configuration, the spurious signals at the D/A converter 220 are estimated at −50 dBc. Note that increasing the sampling clock frequency can achieve a larger spurious free dynamic range of a high frequency output signal because of aliasing during the sampling process.

Figure 3:
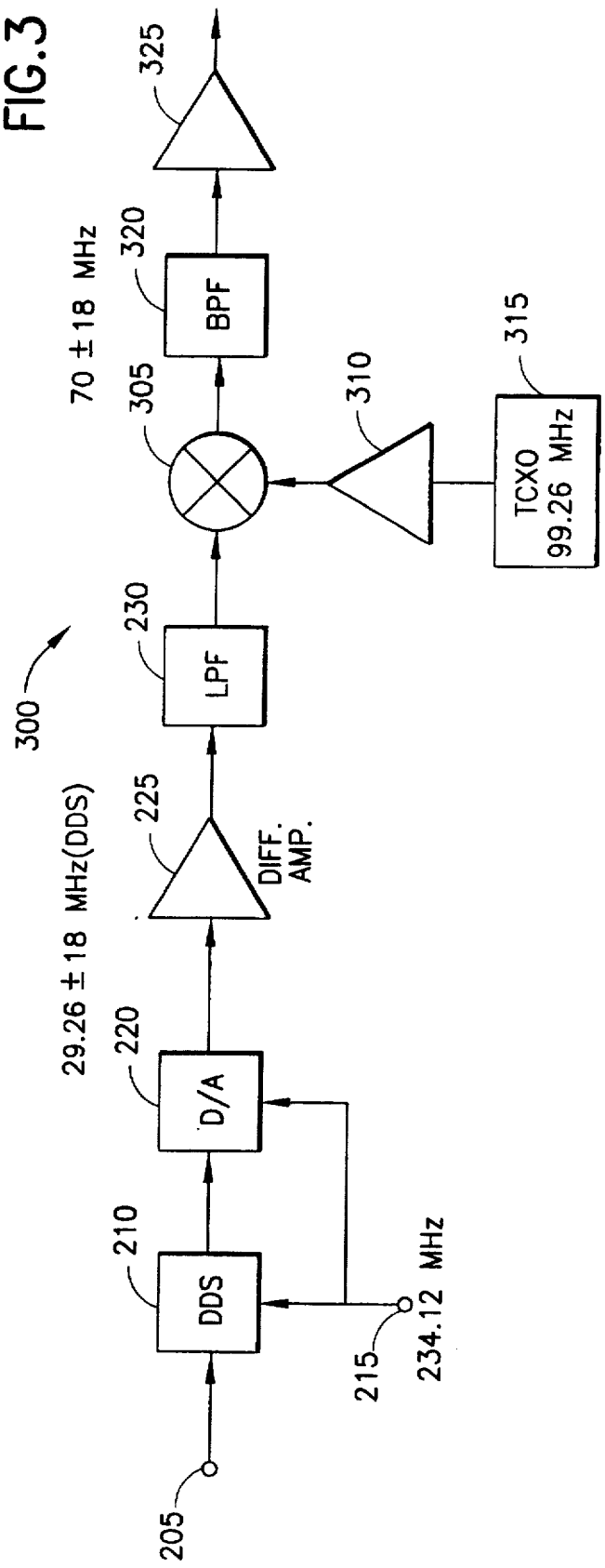
FIG. 3 is a block diagram of a modulator using a direct digital synthesizer with frequency up-conversion in accordance with the present invention.

FIG. 3 is a block diagram of a modulator using a direct digital synthesizer with frequency up-conversion in accordance with the present invention. Like-numbered elements correspond to the elements of the previous figure. The modulator is shown generally at 300. In this case, the DDS 210 provides a data signal at 29.26±18 MHz. This signal is then provided to the D/A converter 220, differential amplifier 225, and LPF 230. A temperature-compensated crystal oscillator (TCXO) 315 provides a signal at a steady 99.26 MHz to an amplifier 310 and a first mixer 305. The first mixer 305 also receives the output of the LPF 230 to provide a signal at 70±18 MHz to a bandpass filter (BPF) 320 and an amplifier 325. Thus, the first mixer 305 up-converts the DDS output from 29.26 to 70 MHz, where it is understood that the output of a mixer is at a frequency which is the absolute value of either the sum or the difference of the input frequencies (e.g., 99.26−29.26=70).

One concern with the architecture of the modulator 300 is that the BPF 320 may not provide adequate rejection of spurious signals when the DDS output frequencies are at the high side, for example, at 29.26+18=47.26 MHz. As discussed below in connection with FIGS. 5–8, double frequency conversion can provide better performance.

Figure 4:
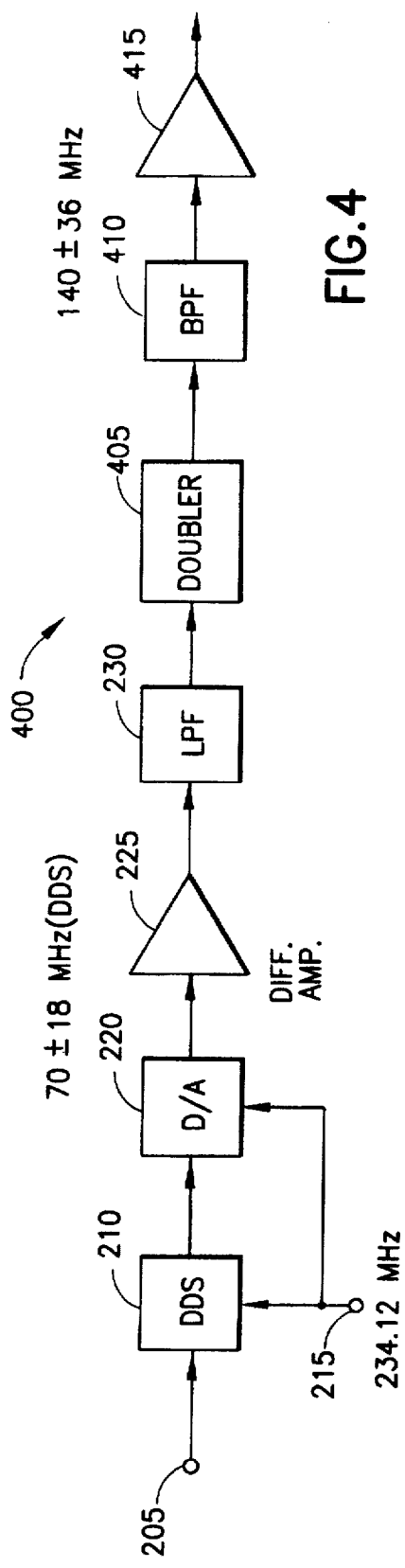
FIG. 4 is a block diagram of a modulator using a direct digital synthesizer with frequency doubling in accordance with the present invention.

FIG. 4 is a block diagram of a modulator using a direct digital synthesizer with frequency doubling in accordance with the present invention. Like-numbered elements correspond to the elements of the previous figures. The modulator is shown generally at 400. In this case, the DDS 210 provides a data signal at 70±18 MHz. This signal is then provided to the D/A converter 220, differential amplifier 225, and LPF 230. In this embodiment, the output from the LPF 230 is provided to a frequency doubler 405 to provide a signal at 140±36 MHz to a BPF 410 and an amplifier 415. The frequency doubler 405 is a device for delivering an output voltage at a frequency which is twice the input frequency. Thus, the input at 70±18 MHz is doubled to 140±36 MHz. Generally, a 140 MHz frequency-agile modulator is much more complicated than a 70 MHz modulator because of higher frequencies and a wider range.

Furthermore, the sampling clock signal which is input to the DDS 210 and D/A converter 220 may be changed to 468.24 MHz to meet the 56 dB minimum spurious signal requirement. In this case, a 12-bit D/A converter rated at about at least 500 MHz is required. For example, a 12-bit, 1 GHz sampling rate D/A converter is available from Analog Devices, Inc. of Norwood, Mass., USA. Alternatively, one may use the Model DAC650 converter available from Burr-Brown Corp. of Tucson, Ariz., USA, which is a 12-bit, 500 MHz device with a spurious signal from 50 to 100 MHz of −52 dBc minimum at +2.7 dBm (decibels relative to the measured signal) output. This spurious signal may by reduced by operating the D/A converter 220 at a lower output power. One concern with the architecture of the modulator 400 is that the third harmonic of the low side signal generated in the doubler 405 may be a problem.

Figure 5:
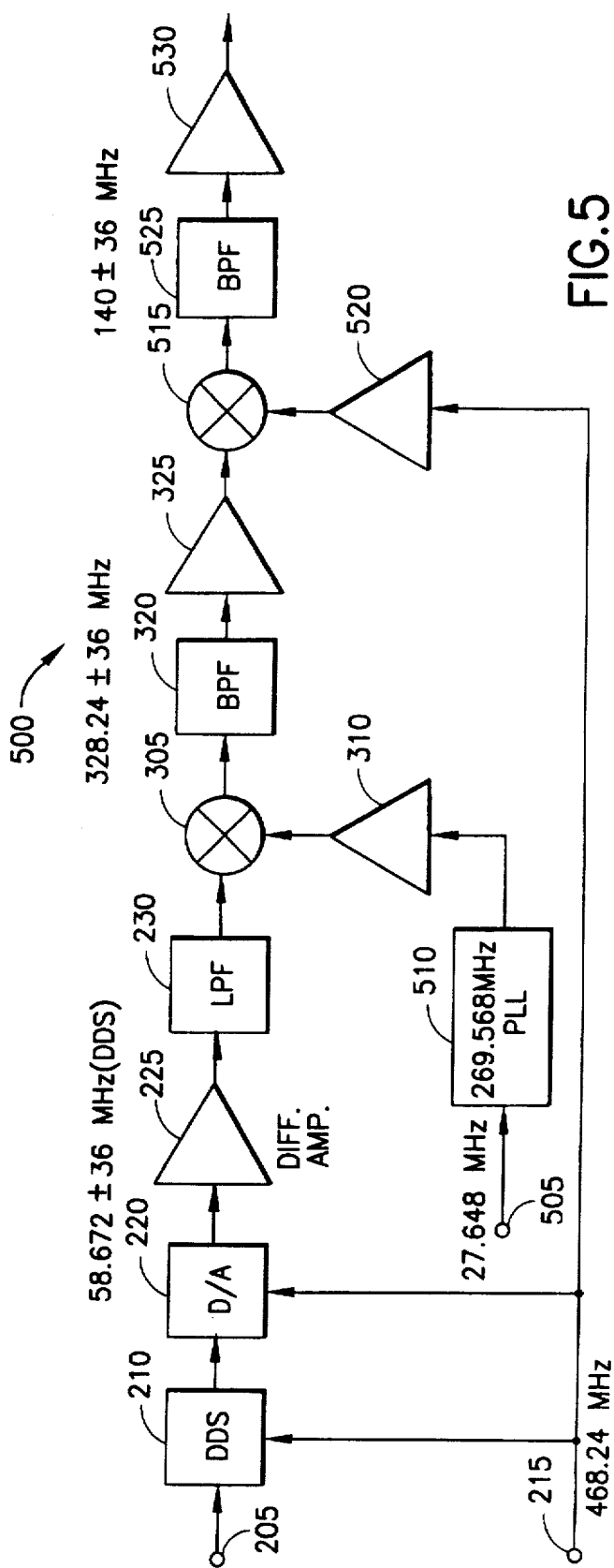
FIG. 5 is a block diagram of a modulator using a direct digital synthesizer with double conversion in accordance with the present invention.

FIG. 5 is a block diagram of a modulator using a direct digital synthesizer with double conversion in accordance with the present invention. Like-numbered elements correspond to the elements of the previous figures. The modulator, shown generally at 500, is a 140 MHz frequency-agile modulator which uses double frequency conversion. In this case, the DDS 210 provides a data signal at 58.672±36 MHz and operates according to a clock signal at 468.24 MHz. This signal is then provided to the D/A converter 220, differential amplifier 225, LPF 230, and the first mixer 305. Furthermore, a first local oscillator 510 operates at 269.568 MHz and is phase-locked to a 27.648 MHz signal provided via terminal 505 using a phase-lock loop (PLL). The 269.568 MHz signal is provided to an amplifier 310 and the first mixer 305, where the 58.672 MHz DDS signal is up-converted to 328.24±36 MHz. The second local oscillator in the modulator 500 is the 468.24 MHz signal which is input to the amplifier 520 and then to the second mixer 515. This signal may be provided with a voltage controlled oscillator (VCO) which is phase-locked to the system clock for lower phase noise.

At the second mixer 515, the 328.24 MHz signal is received from the amplifier 325 and down-converted to 140±36 MHz. The 140 MHz signal is then provided to a BPF 525 and an amplifier 530. Thus, with the modulator 500, both local oscillators are provided at fixed frequencies using respective PLLs. Moreover, the DDS 210 provides a frequency-agile output which is up-converted and then down-converted to the desired frequency.

The architecture of the modulator 500 provides reduced phase noise compared to conventional modulators which use a frequency synthesizer to provide the frequency agility. Moreover, the use of the clock signal frequency for the second oscillator in accordance with the present invention eliminates the need for a second, independent PLL frequency generator, thereby reducing circuit expense and complexity.

Note that, with the modulator 500, the skew of the clock and the signal are critical because the frequency of the sampling clock is very high. An adjustable delay line (not shown) may be required for the clock to optimize the modulator's performance. The clock and signal slew may be minimized by providing a board layout where the traces of the clock and the signal have an equal length.

Furthermore, the harmonic performance (e.g., slew rate) of the high frequency operational amplifier 225 which is located directly after the D/A converter 220 is a concern. In particular, the second harmonic of current available operational amplifiers may be undesirably high with a relatively small load. For example, with the Model AD9617 op-amp by Analog Devices, the second harmonic is −42 dBc at 90 MHz, and −50 dBc at 50 MHz, with a 100 ohm load. However, this harmonic may be reduced to less than −60 dBc by increasing the load to more than 500 ohms. Another possible way to reduce the harmonics is to use a radio-frequency (RF) transformer (not shown) at the output of the D/A converter 220. Note also that the 328.24 MHz BPF 320 must be able to reject the local oscillator 510 which operates at 269.568 MHz.

Additionally, the phase noise with the double conversion modulator 500 is advantageously reduced by 3 dB compared to the modulator 400 since the sampling clock at 468.24 MHz is twice the 234.12 MHz frequency. This can be seen by noting that, in a PLL circuit, the phase noise, P, is a function of the output frequency, $F_{out}$, and the reference (e.g., sampling clock) frequency, $F_{ref}$, according to the relationship $P=k \times F_{out}/F_{ref}$ where k is a constant.

Figure 6:
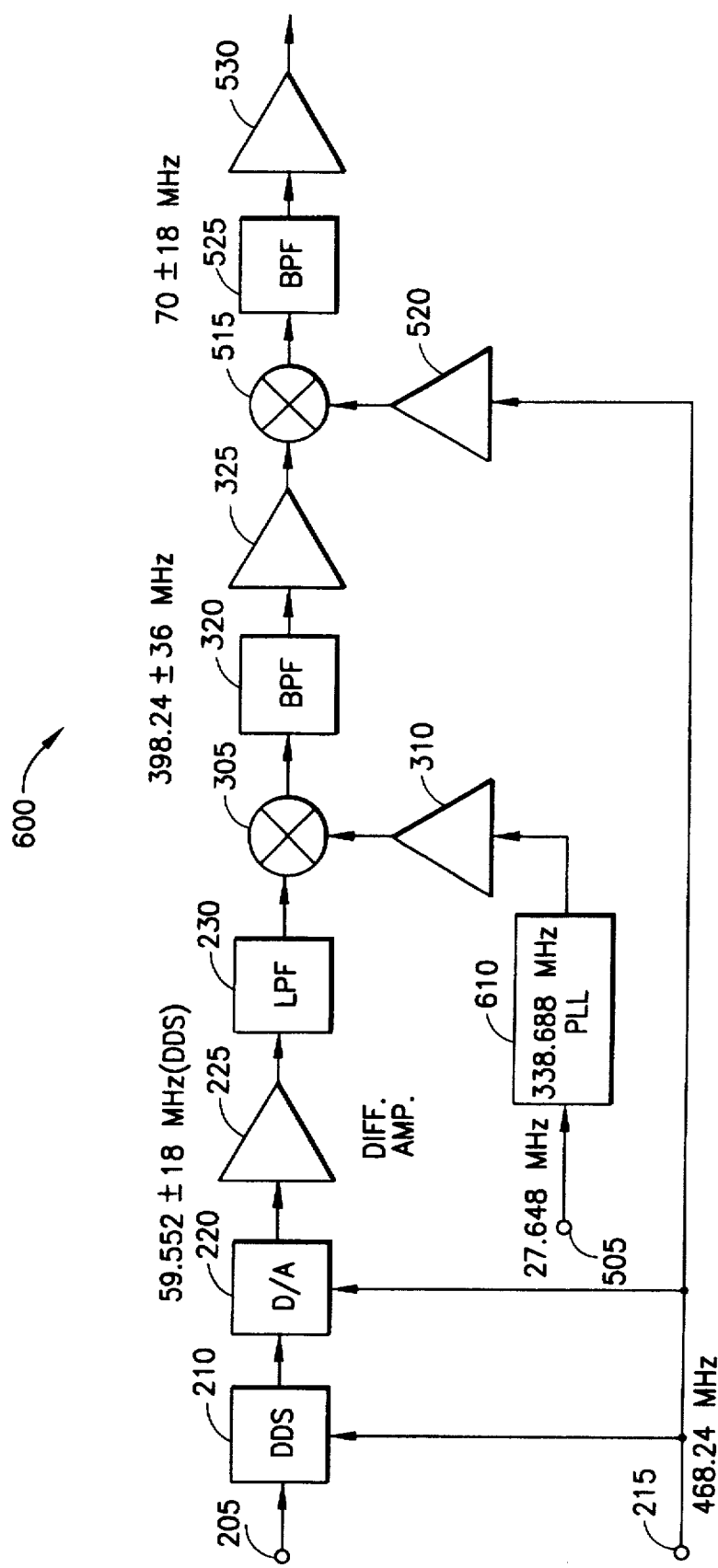
FIG. 6 is a block diagram of another embodiment of a modulator using a direct digital synthesizer with double conversion in accordance with the present invention.

FIG. 6 is a block diagram of another embodiment of a modulator using a direct digital synthesizer with double conversion in accordance with the present invention. Like-numbered elements correspond to the elements of the previous figures. The modulator, shown generally at 600,is a 70 MHz frequency-agile modulator which uses double frequency conversion. Furthermore, the 70 MHz agile modulator 600 uses the same architecture as the 140 MHz modulator 500.

In this case, the DDS 210 provides a data signal at 59.552±18 MHz. This signal is then provided to the D/A converter 220, differential amplifier 225, LPF 230, and the first mixer 305. The first local oscillator 610 operates at 338.688 MHz and is phase-locked to a 27.648 MHz signal using a phase-lock loop (PLL). The 338.688 MHz signal is provided to an amplifier 310 and the first mixer 305, where the 59.552 MHz DDS signal is up-converted to 398.24±18 MHz. The second local oscillator in the modulator 600 is the 468.24 MHz signal which is input to the amplifier 520 and then to the second mixer 515. At the second mixer 515, the 398.24 MHz signal is received from the amplifier 325 and down-converted to 70±36 MHz. The 70 MHz signal is then provided to a BPF 525 and an amplifier 530.

Figure 7:
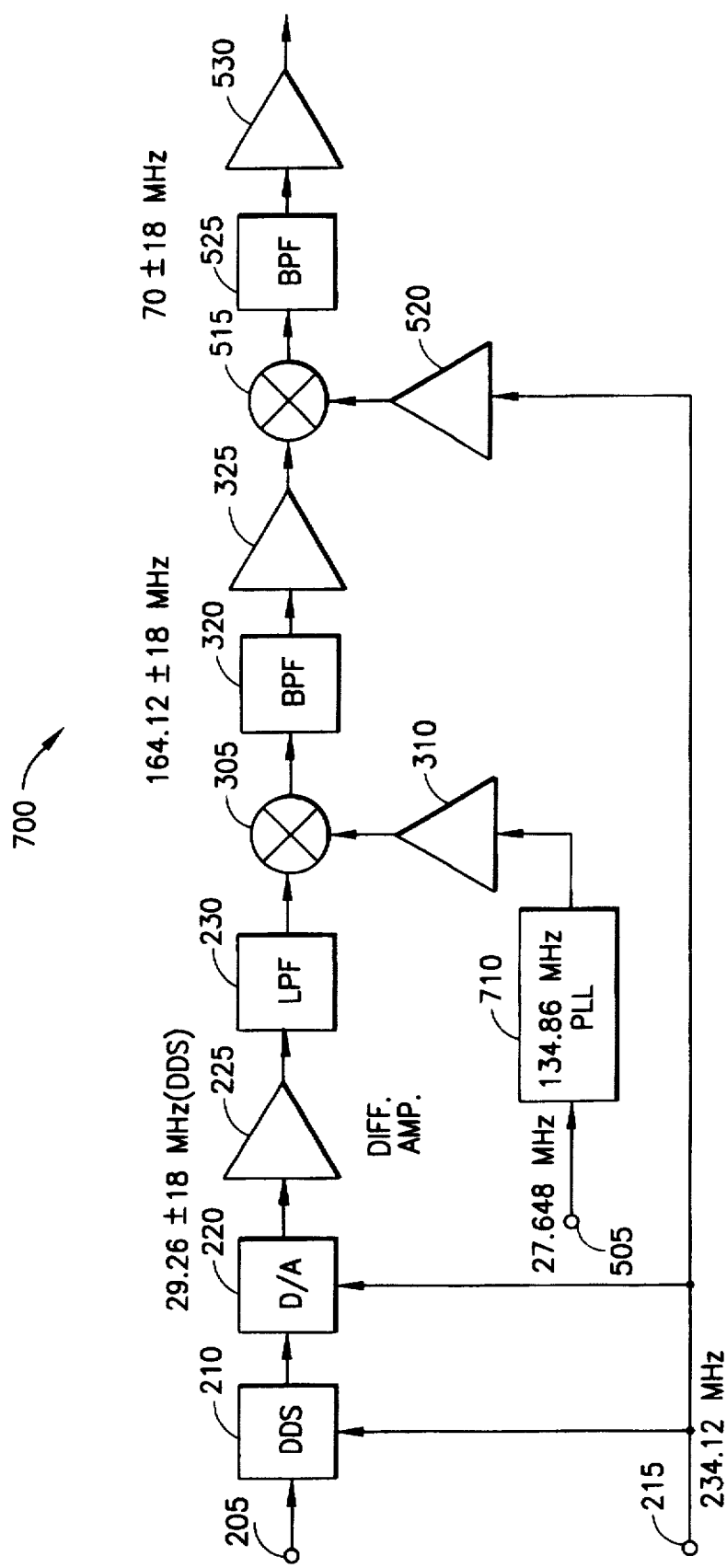
FIG. 7 is a block diagram of another embodiment of a modulator using a direct digital synthesizer with double conversion in accordance with the present invention.

FIG. 7 is a block diagram of another embodiment of a modulator using a direct digital synthesizer with double conversion in accordance with the present invention. Like-numbered elements correspond to the elements of the previous figures. The modulator, shown generally at 700, is similar to the modulator 600 in that it provides an output at 70±18 MHz. However, the modulator 700 employs a sampling clock operating at 234.12 MHz instead of 468.24 MHz. In this case, the DDS 210 provides a data signal at 29.26±18 MHz. This signal is then provided to the D/A converter 220, differential amplifier 225, LPF 230, and the first mixer 305. The first local oscillator 710 operates at 134.86 MHz and is phase-locked to a 27.648 MHz signal using a phase-lock loop (PLL). The 134.86 MHz signal is provided to an amplifier 310 and the first mixer 305, where the 29.26 MHz DDS signal is up-converted to 164.12±18 MHz. The second local oscillator in the modulator 700 is the 234.12 MHz signal which is input to the amplifier 520 and then to the second mixer 515. At the second mixer 515, the 164.12 MHz signal is received from the amplifier 325 and down-converted to 70±18 MHz. The 70 MHz signal is then provided to a BPF 525 and an amplifier 530. Alternatively a TCXO may be substituted for the 134.86 MHz PLL 710.

Figure 8:
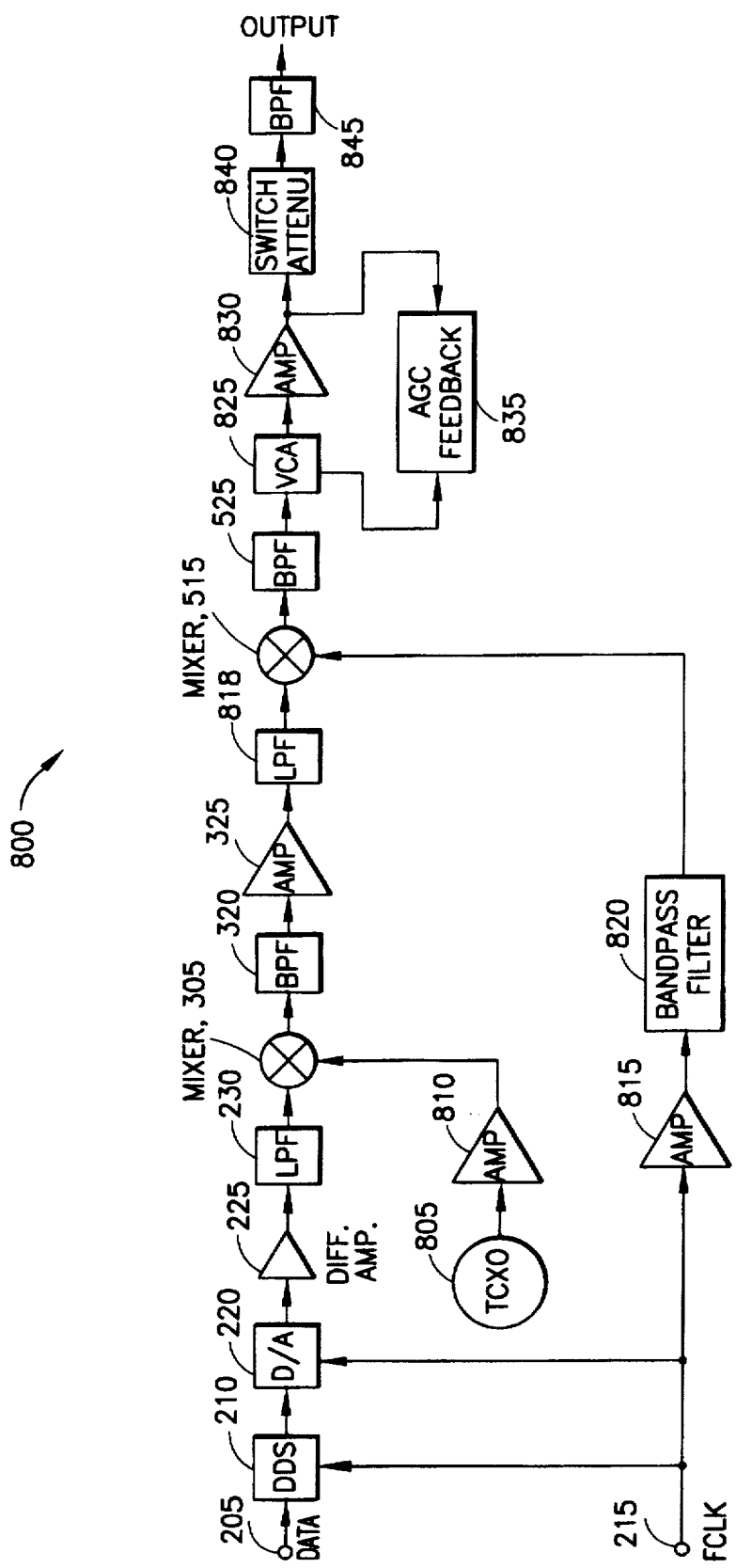
FIG. 8 is a block diagram of another embodiment of a modulator using a direct digital synthesizer with double conversion in accordance with the present invention.

FIG. 8 is a block diagram of a another embodiment of a modulator using a direct digital synthesizer with double conversion in accordance with the present invention. Like-numbered elements correspond to the elements of the previous figures. Digital data such as QPSK data is input via terminal 205 to a DDS 210. The DDS output frequency may be designed to be adjustable in a range, e.g., from 11 to 47 MHz. The digital signal is converted to an analog signal at D/A converter 220. After being amplified at amplifier 225, the signal is provided to LPF 230, which may be a sin(x)/x filter to provide better amplitude versus frequency response. In particular, the sin(x)/x filter 230 compensates for the frequency response due to a Fourier transformation at the D/A converter 220. The signal output from the LPF 230 is up-converted to a range, e.g., between 152 and 182 MHz, at a first mixer 305, and then processed through a BPF 320 and amplifier 325.

In particular, the amplifier 325 may create harmonics which comprise some of the spurious signals seen at the output of the modulator 800. Accordingly, in this embodiment of the present invention, an LPF 818 is provided after the amplifier 325 to reject these harmonics. Alternatively, a bandpass filter may be used, but a lowpass filter is generally easier to design and more cost effective. As demonstrated below, the LPF 818 can significantly reduce the spurious signal output from the first IF amplifier 325.

At the second mixer 515, the signal is down-converted to a range, e.g., between 52 to 88 MHz. A Voltage-Controlled Attenuator (VCA) 825 attenuates the signal strength as a function of the direct current voltage which is applied via an Automatic Gain Control (AGC) amplifier 835 in a feedback loop. The loop includes the VCA 825, amplifier 830, and AGC feedback amplifier 835. The AGC amplifier 835 provides a constant and stable output power in the signal which is provided to a switching attenuator 840. The switching attenuator 840 can variably adjust the output power of the signal, which is then provided to a bandpass filter 845. In the example discussed, the output signal is at 70 MHz, which is a suitable carrier frequency for a satellite television transmitter.

With the configuration shown, all spurious signals were measured at less than 56 dB from the carrier within the passband from 52 to 88 MHz. Generally, the spurious response is mainly restricted by the performance of the D/A converter 220. Table 1 below shows the strength of the spurious signal from the second harmonic of the first IF amplifier 325 for the modulator 800 of FIG. 8 prior to inserting the LPF 818. The first column indicates the output frequency of the modulator, the second column indicates the output frequency of the D/A converter (DAC) 220, the third column indicates the first IF (e.g., after the first mixer 305), the fourth column indicates the second harmonic of the first IF, which is simply twice the first IF, the fifth column indicates the spurious signal frequency, the sixth column indicates the difference between the output frequency and the spurious signal frequency, and the seventh column indicates the measured strength of the spurious signal. In the example shown, the first mixer frequency (e.g., from TCXO 805) is 134.86 MHz, and the second mixer frequency (e.g., from signal Fclk) is 234.1256 MHz. As can be seen, the measured spurious signal strength is as high as −41 dBc without the LPF 818.

TABLE 1

| Output Frequency (MHz) | DAC Output Frequency (MHz) | 1st IF Frequency (MHz) | 2nd Harmonic (MHz) | Spurious (MHz) | Spurious-Output Frequency (MHz) | Measured (dBc) |
|---|---|---|---|---|---|---|
| 52 | 47.2656 | 182.1256 | 364.2512 | 130.1256 | 78.1256 | <−60 |
| 55 | 44.2656 | 179.1256 | 358.2512 | 124.1256 | 69.1256 | <−60 |
| 60 | 39.2656 | 174.1256 | 348.2512 | 114.1256 | 54.1256 | <−60 |
| 65 | 34.2656 | 169.1256 | 338.2512 | 104.1256 | 39.1256 | <−60 |
| 68 | 31.2656 | 166.1256 | 332.2512 | 98.1256 | 30.1256 | <−60 |
| 70 | 29.2656 | 164.1256 | 328.2512 | 94.1256 | 24.1256 | −50 |
| 75 | 24.2656 | 159.1256 | 318.2512 | 84.1256 | 9.1256 | −43 |
| 80 | 19.2656 | 154.1256 | 308.2512 | 74.1256 | −5.8744 | −41 |
| 85 | 14.2656 | 149.1256 | 298.2512 | 64.1256 | −20.8744 | −41 |
| 88 | 11.2656 | 146.1256 | 292.2512 | 58.1256 | −29.8744 | −41 |

Table 2 below shows the strength of the spurious signal from the second harmonic of the first IF amplifier 325 for the modulator 800 of FIG. 8 after inserting the LPF 818. As can be seen, the highest measured spurious signal strength is reduced to −56 dBc.

TABLE 2

| Output Frequency (MHz) | DAC Output Frequency (MHz) | 1st IF Frequency (MHz) | 2nd Harmonic (MHz) | Spurious (MHz) | Spurious-Output Frequency (MHz) | Measured (dBc) |
|---|---|---|---|---|---|---|
| 52 | 47.2656 | 182.1256 | 364.2512 | 130.1256 | 78.1256 | <−60 |
| 55 | 44.2656 | 179.1256 | 358.2512 | 124.1256 | 69.1256 | <−60 |
| 60 | 39.2656 | 174.1256 | 348.2512 | 114.1256 | 54.1256 | <−60 |
| 65 | 34.2656 | 169.1256 | 338.2512 | 104.1256 | 39.1256 | <−60 |
| 68 | 31.2656 | 166.1256 | 332.2512 | 98.1256 | 30.1256 | <−60 |
| 70 | 29.2656 | 164.1256 | 328.2512 | 94.1256 | 24.1256 | −67 |
| 75 | 24.2656 | 159.1256 | 318.2512 | 84.1256 | 9.1256 | −57 |
| 80 | 19.2656 | 154.1256 | 308.2512 | 74.1256 | −5.8744 | −56 |
| 85 | 14.2656 | 149.1256 | 298.2512 | 64.1256 | −20.8744 | −60 |
| 88 | 11.2656 | 146.1256 | 292.2512 | 58.1256 | −29.8744 | −57 |

The improvement demonstrated by the LPF 818 as indicated in Table 2 was accomplished using a filter with the following specifications:

| | |
|---|---|
| Passband: | 146 to 182 MHz |
| Passband ripple: (maximum) | +/− 0.1 dB peak-to-peak |
| Insertion Loss: | 1.0 dB maximum |
| Transition/Rejection: minimum | 290 to 500 MHz, −25 dB |
| In/Out VSWR: | 1.3:1 maximum |
| In/Out Impedance: | 50 ohms |
| Group Delay Variation in Passband: | 5 ns peak-to-peak maximum |
| Temperature Range: | −5 to +85° C. |
| Input Power: | +20 dBm maximum |

Figure 9:
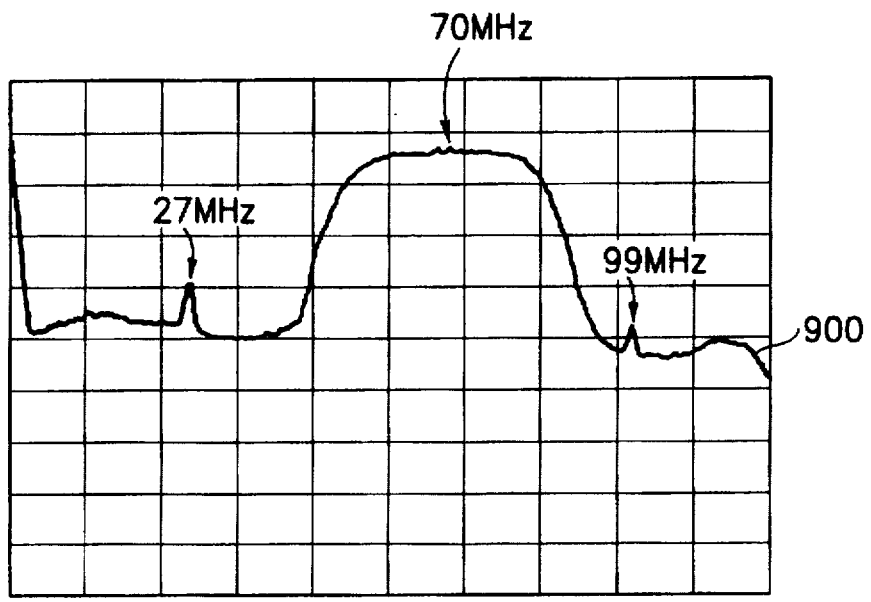
FIG. 9 is an illustration of the frequency spectrum of the output of a single conversion modulator.

FIG. 9 is an illustration of the frequency spectrum of the output of a single conversion modulator. The configuration tested had one mixer with a local oscillator operating at 99 MHz. The illustration is a trace from a spectrum analyzer with a 110 ms sweep, a resolution bandwidth of 1 MHz, and a video bandwidth of 3 KHz. The horizontal axis represents a frequency range from 1 MHz to 121.2 MHz, with equally spaced divisions. The vertical axis represents a decibel scale with equal divisions, with 10 dB per vertical division. The spectrum, shown at 900, includes a center frequency of 70 MHz with −3 dBc band edges at approximately 56 and 84 MHz. Thus, the passband bandwidth is approximately 28 MHz in this example. The noise floor is at −35 dB with respect to the top envelope of the spectrum 900. Spurious signals are clearly distinct at 27 MHz and 97 MHz.

Figure 10:
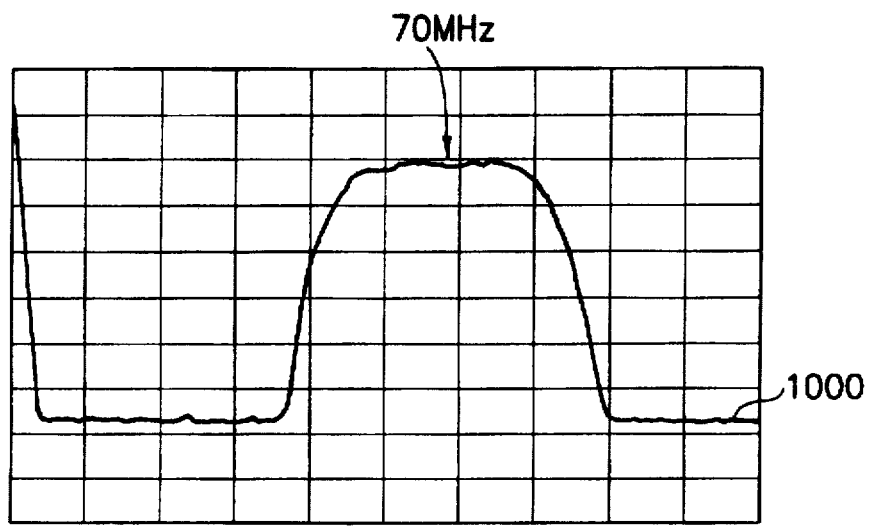
FIG. 10 is an illustration of the frequency spectrum of the output of a modulator using a direct digital synthesizer with double conversion in accordance with the present invention.

FIG. 10 is an illustration of the frequency spectrum of the output of a modulator using a direct digital synthesizer with double conversion in accordance with the present invention. The horizontal and vertical axes correspond to the horizontal and vertical axes of FIG. 9, respectively. The configuration tested corresponded to the modulator of FIG. 8, with double conversion with a first oscillator operating at 134 MHz and a second oscillator operating at 234 MHz. These local oscillator frequencies are well removed from the desired modulator frequency range of 52 to 88 MHz, and therefore are more easily rejected by the filters. The spectrum, shown at 1000, is significantly improved relative to the spectrum 900. The spurious signals are very low, and the noise floor is about 55 dB with respect to the top envelope.

Accordingly, it can be seen that the present invention provides a DDS modulator configuration which significantly reduces undesirable spurious noise signals in a modulated data signal. Furthermore, the modulator provides an efficient design which employs a common clock frequency for the DDS, the D/A converter and the second local oscillator.

Although the invention has been described in connection with various specific embodiments, those skilled in the art will appreciate that numerous adaptations and modifications may be made thereto without departing from the spirit and scope of the invention as set forth in the claims.

I claim:

1. A direct digital synthesis modulator, comprising:
   a direct digital synthesizer for generating a data signal in response to a clock signal operating at a clock frequency;
   a first local oscillator for providing a first mixing signal at a first mixing frequency;
   a first mixer for mixing said data signal and said first mixing signal to provide an intermediate signal;
   a second local oscillator responsive to said clock signal for providing a second mixing signal at said clock frequency; and
   a second mixer for mixing said intermediate signal and said second mixing signal to provide an output signal; wherein:
   said first mixer up-converts said data signal from said direct digital synthesizer; and
   said second mixer down-converts said intermediate signal to provide said output signal.

2. The modulator of claim 1, wherein:
   said data signal is provided at an adjustable frequency by said direct digital synthesizer.

3. The modulator of claim 2 wherein:
   said first mixing frequency and said clock frequency are substantially fixed.

4. The modulator of claim 1, wherein:
   said data signal is provided as a quadrature phase-shift keyed (QPSK) signal by said direct digital synthesizer.

5. The modulator of claim 1, further comprising:
   a digital-to-analog converter coupled to said direct digital synthesizer for converting said data signal;
   said digital-to-analog converter being responsive to said clock signal.

6. The modulator of claim 1, further comprising:
   a filter coupled between said direct digital synthesizer and said first mixer for filtering said data signal according to a sin(x)/x function.

7. A method for modulating a data signal, comprising the steps of:
   digitally synthesizing a data signal in response to a clock signal operating at a clock frequency;
   providing a first mixing signal at a first mixing frequency;
   mixing said data signal and said first mixing signal to provide an intermediate signal;
   providing a second mixing signal at said clock frequency which is responsive to said clock signal; and
   mixing said intermediate signal and said second mixing signal to provide an output signal; wherein:
   said mixing of said data signal and said first mixing signal up-converts said data signal; and
   said mixing of said intermediate signal and said second mixing signal down-converts said intermediate signal to provide said output signal.

8. The method of claim 7, wherein:
   said data signal is digitally synthesized at an adjustable frequency.

9. The method of claim 8, wherein:
   said first mixing frequency and said clock frequency are substantially fixed.

10. The method of claim 7, wherein:
    said data signal is digitally synthesized as a quadrature phase-shift keyed (QPSK) signal.

11. The method of claim 7, comprising the further step of:
    converting said data signal from digital to analog in response to said clock signal prior to said mixing of said data signal and said first mixing signal.

12. The method of claim 7, comprising the further step of:
    filtering said data signal according to a sin(x)/x function prior to said mixing of said data signal and said first mixing signal.

13. A direct digital synthesis modulator, comprising:
    a direct digital synthesizer for generating a data signal in response to a clock signal operating at a clock frequency;
    a first local oscillator for providing a first mixing signal at a first mixing frequency;
    a first mixer for mixing said data signal and said first mixing signal to provide an intermediate signal;
    a second local oscillator responsive to said clock signal for providing a second mixing signal at said clock frequency;
    a second mixer for mixing said intermediate signal and said second mixing signal to provide an output signal; and
    automatic gain control means coupled to said second mixer for stabilizing the power of said output signal.

14. A direct digital synthesis modulator, comprising:
    a direct digital synthesizer for generating a data signal in response to a clock signal operating at a clock frequency;
    a first local oscillator for providing a first mixing signal at a first mixing frequency;
    a first mixer for mixing said data signal and said first mixing signal to provide an intermediate signal;
    a second local oscillator responsive to said clock signal for providing a second mixing signal at said clock frequency;
    a second mixer for mixing said intermediate signal and said second mixing signal to provide an output signal; and
    switchable attenuator means coupled to said second mixer for adjusting the power of said output signal.

15. A direct digital synthesis modulator, comprising:
    a direct digital synthesizer for generating a data signal in response to a clock signal operating at a clock frequency;
    a first local oscillator for providing a first mixing signal at a first mixing frequency;
    a first mixer for mixing said data signal and said first mixing signal to provide an intermediate signal;
    a second local oscillator responsive to said clock signal for providing a second mixing signal at said clock frequency;
    a second mixer for mixing said intermediate signal and said second mixing signal to provide an output signal;
    an amplifier coupled between said first and second mixers for amplifying said intermediate signal; and
    a filter coupled between said amplifier and said second mixer for rejecting nonlinear distortion introduced into said intermediate signal by said amplifier.

16. A method for modulating a data signal, comprising the steps of:
    digitally synthesizing a data signal in response to a clock signal operating at a clock frequency;

providing a first mixing signal at a first mixing frequency;

mixing said data signal and said first mixing signal to provide an intermediate signal;

providing a second mixing signal at said clock frequency which is responsive to said clock signal;

mixing said intermediate signal and said second mixing signal to provide an output signal;

amplifying said intermediate signal prior to said mixing of said intermediate signal and said second mixing signal to provide an amplified intermediate signal; and filtering said amplified intermediate signal to reject nonlinear distortion introduced into said intermediate signal by said amplifying step.

* * * * *